(12) United States Patent
Mergenthaler et al.

(10) Patent No.: US 8,827,605 B2
(45) Date of Patent: Sep. 9, 2014

(54) DRILLING TOOL

(75) Inventors: Peter Karl Mergenthaler, Markt Bibart (DE); Berthold Heinrich Zeug, Furth (DE)

(73) Assignee: Kennametal Inc., Latrobe, PA (US)

( * ) Notice: Subject to any disclaimer, the term of this patent is extended or adjusted under 35 U.S.C. 154(b) by 1073 days.

(21) Appl. No.: 12/811,847

(22) PCT Filed: Dec. 12, 2008

(86) PCT No.: PCT/EP2008/010602
§ 371 (c)(1),
(2), (4) Date: Sep. 9, 2010

(87) PCT Pub. No.: WO2009/095060
PCT Pub. Date: Aug. 6, 2009

(65) Prior Publication Data
US 2010/0322732 A1    Dec. 23, 2010

(30) Foreign Application Priority Data

Jan. 31, 2008    (DE) .................... 20 2008 001 348 U (51) Int. Cl.
| B23B 51/02 | (2006.01) |
| B23B 27/22 | (2006.01) |
| B23B 51/04 | (2006.01) |
| B23B 27/14 | (2006.01) |

(52) U.S. Cl.
CPC .............. *B23B 51/048* (2013.01); *B23B 51/02* (2013.01); *B23B 27/143* (2013.01); *B23B 2200/087* (2013.01); *B23B 2200/081* (2013.01); *B23B 2200/125* (2013.01); *B23B 2251/50* (2013.01); *Y10S 408/713* (2013.01)

USPC ............ 408/223; 408/231; 408/713; 407/114

(58) Field of Classification Search
CPC .. B23B 51/02; B23B 2251/50; B23B 27/143; B23B 2200/081; B23B 2200/087
USPC ................... 408/231, 233, 713; 407/113, 114
See application file for complete search history.

(56) References Cited

U.S. PATENT DOCUMENTS

| 4,074,949 A | 2/1978 | Hochmuth et al. |
| 4,648,760 A | 3/1987 | Karlsson et al. |

(Continued)

FOREIGN PATENT DOCUMENTS

| DE | 201 18 111 U1 | 4/2002 |
| EP | 0 796 161 A1 | 9/1997 |

(Continued)

*Primary Examiner* — Eric A Gates
(74) *Attorney, Agent, or Firm* — Larry R. Meenan, Esq.

(57) ABSTRACT

The invention discloses a drilling tool having at least one chip groove for chip removal, having an insert seat which is formed at the end of the chip groove and serves as a holder for an indexable insert with at least one main cutting edge on the two narrow sides and with at least one secondary cutting edge on the two longitudinal sides of one face side wherein the indexable insert has two face sides facing away from one another and bears with its inactive face side on a holding surface of the insert seat, and a partial region of the inactive secondary cutting edge of its active face side lies in the insert seat at a distance from the adjoining side wall of the insert seat created by a slot, and wherein a guide lip which covers the slot protrudes out of the top side of the side wall in the direction of the inactive secondary cutting edge.

5 Claims, 6 Drawing Sheets

(56) References Cited

U.S. PATENT DOCUMENTS

| | | |
|---|---|---|
| 5,800,100 A | 9/1998 | Krenzer |
| 7,232,279 B2 * | 6/2007 | Smilovici et al. ............. 407/113 |
| 8,491,234 B2 * | 7/2013 | Fang et al. .................... 407/113 |
| 2010/0119313 A1 * | 5/2010 | Hartlohner et al. ........... 407/103 |
| 2011/0274506 A1 * | 11/2011 | Kakai ............................. 407/40 |

FOREIGN PATENT DOCUMENTS

| | | |
|---|---|---|
| JP | 200266826 A | 3/2002 |
| JP | 2004314301 A | 11/2004 |
| JP | 2006181702 A | 7/2006 |
| JP | 2006281391 A | 10/2006 |

\* cited by examiner

DRILLING TOOL

BACKGROUND OF THE INVENTION

The invention relates to a drilling tool according to the preamble of claim 1. Such a drilling tool is known in principle from EP-B-0 796 161. The drilling tool consists of a parent body and cutting inserts which can be inserted into the parent body. The parent body is provided with flutes for the chip removal. These flutes can either be straight or twisted. For attaching the cutting inserts, an insert seat is provided at the end of one or more flutes. This insert seat serves as a receptacle for the cutting insert.

In the case of the above-mentioned drilling tool, the cutting insert is designed as a reversible insert. The known reversible insert has a base surface and a rake face facing away from the base surface. The reversible inserts rests with the base surface on a corresponding holding surface in the insert seat. The reversible insert has a substantially rectangular basic shape, with the result that the rake face is also substantially rectangular. In this way, the long side edges of the rake face each form a secondary cutting edge and the short side edges each form a main cutting edge. If the reversible insert rests in the insert seat, one main cutting edge and one secondary cutting edge are rendered inactive because they bear against the side walls of the insert seat, whereas the remaining active secondary cutting edge and the likewise remaining active main cutting edge project from the insert seat and thus from the tool in order to be able to machine the drill hole when the drilling tool is rotating. The active main cutting edge and the active secondary cutting edge, on the one hand, and the inactive main cutting edge and the inactive secondary cutting edge, on the other hand, in each case form a cutting edge pair belonging to one another. If the active main cutting edge and the active secondary cutting edge have become worn, the reversible insert in the insert seat is simply rotated by 180° in the plane of the insert seat, with the result that the previously active main cutting edge and the previously active secondary cutting edge are rotated into their respective inactive positions, whereas the previously inactive cutting edges now project as active cutting edges from the insert seat in the manner described. The reversible inserts provided in the known drilling tool therefore always have two usable cutting edge pairs, each formed by a secondary cutting edge and a main cutting edge.

SUMMARY OF THE INVENTION

Proceeding from the prior art described above, the object of the invention is to provide a drilling tool which has more than two usable cutting edge pairs formed by a main cutting edge and a secondary cutting edge. This object is achieved by the combination of features in claim 1. The claims referring back to claim 1 contain partly advantageous developments of the invention and partly developments of the invention that are inventive on their own.

An essential component of the invention is the use of indexable inserts. These indexable inserts differ from the above-mentioned reversible inserts in that not only is one main surface configured as a rake face, but rather both main surfaces facing away from one another are rake faces. Compared with the prior art, therefore, the base surface that is functionless with regard to the cutting operation is dispensed with. Since the configuration of the rake face of the indexable insert according to the invention is substantially oriented toward the configuration of the rake face of the rake face configuration known from EP-B-0 796 161, a slot is left clear between at least a section of the inactive cutting edge of the active rake face and the adjacent side wall of the insert seat when the indexable insert is resting in the insert seat. In order to prevent chips or chip residues from catching in this slot, which chips or chip residues can destroy the walls of the hole when the drilling tool is rotating or can result in jamming of the drilling tool, a guide lip covering the gap projects from the top side of the side wall of the insert seat in the direction of the inactive secondary cutting edge. The guide lip therefore serves as a chip deflector element and in this way directs the cut material into the flute, which in turn is designed to be twisted or straight and via which the cut chip material is removed.

It is therefore possible with the invention to use an indexable insert having two rake face sides facing away from one another, in which indexable insert the rake faces thus produced are configured in a similar manner to a rake face of the reversible insert described at the beginning. With the invention, therefore, not only two cutting edge pairs, each having a main cutting edge and a secondary cutting edge, but rather four cutting edge pairs are available during the machining. The doubling of the number of rake faces is therefore accompanied by a doubling of the effective cutting edge pairs. The consumption of material for the production of the cutting inserts is halved by this doubling of the cutting edge pairs. This results in considerable cost advantages. The material and production costs per cutting edge pair are significantly reduced. In addition, only half the number of cutting inserts need to be kept in stock for the same number of cutting edge pairs as in the prior art. Finally, the use of an indexable insert having double the amount of rake face sides that can be used is also more environmentally compatible because less energy is consumed per cutting edge pair during production and the consumption of material drops significantly for each cutting insert.

In an advantageous configuration, the guide lip integrally formed on the side wall of the insert seat covers the inactive secondary cutting edge of the active rake face and therefore protects the latter from being damaged by cut material. The guide lip is in this case effective as a secondary flank adjoining the rake face and thus promotes rapid and reliable chip removal in the direction of the flute.

In a further configuration, one or more relieved portions are provided in the holding surface, in the side wall or in the holding surface and the side wall. These relieved portions serve to accommodate projections of the inactive rake face side of the indexable insert. Such projections can serve as chip breakers. This helps the indexable insert and its inactive rake face to rest on the holding surface of the insert seat in an especially planar fashion and facilitates especially tight contact with the side wall. With regard to the position at the side wall, there is also the additional advantage of the minimization of the slot between the inactive secondary cutting edge and the side wall. The relieved portions in the side wall therefore facilitate especially close contact of the indexable insert against the side wall.

In a preferred embodiment of the invention, the number and position of the relieved portions corresponds exactly to the number and position of the corresponding projections on the indexable insert. In a further preferred embodiment, the guide lip covering the inactive secondary cutting edge of the active rake face can be added to the drilling tool having the relieved portions explained above.

In a further configuration, those side walls of the cutting insert body forming the indexable insert that are defined at the margin by the secondary cutting edges are configured in such a way that a section of the side wall tapers in the direction of the respective secondary cutting edge. When the tool is rotating, this tapering produces a clearance for the tool. In this way, it is possible for the indexable inserts to be able to maintain their central position in the tool. This means that the main cutting edges of the tool are in alignment with the center line of the hole circle. In a further development of this configuration of the cutting insert, the tapered region determines a substantially triangular area on the side wall of the body of the indexable insert.

DESCRIPTION OF THE PREFERRED EXEMPLARY EMBODIMENTS

The drilling tool 1 has two flutes 2 in the exemplary embodiment. A respective indexable insert 3 is held in an insert seat 4 at the end (shown in FIG. 1) of the two flutes 2.

A fixing hole 5 passes centrally through the indexable insert 3. In the final fitted state, a screw or the like passes through the fixing hole 5 in order to effectively fix the indexable insert 3 on the drilling tool 1.

The body of the indexable insert 3 has two opposite long side walls 6 and two likewise opposite short side walls 7. The side walls 6, 7 are in each case defined by the two flat planes formed as rake faces 8. Portions of the secondary cutting edges 9 and of the main cutting edges 10 are formed in each case in the region between the side walls 6, 7 and the rake faces 8. In the exemplary embodiment shown in FIG. 1, the right-hand secondary cutting edge 9 is the active secondary cutting edge and the main cutting edge 10 facing away from the flute 2 is the active main cutting edge. The inactive main cutting edge 10 bears against the side wall 11 of the insert seat 4. The same applies to the inactive secondary cutting edge 9 arranged on the left in FIG. 1. The secondary cutting edge 9 here is covered by the guide lip 12.

Figure 1:
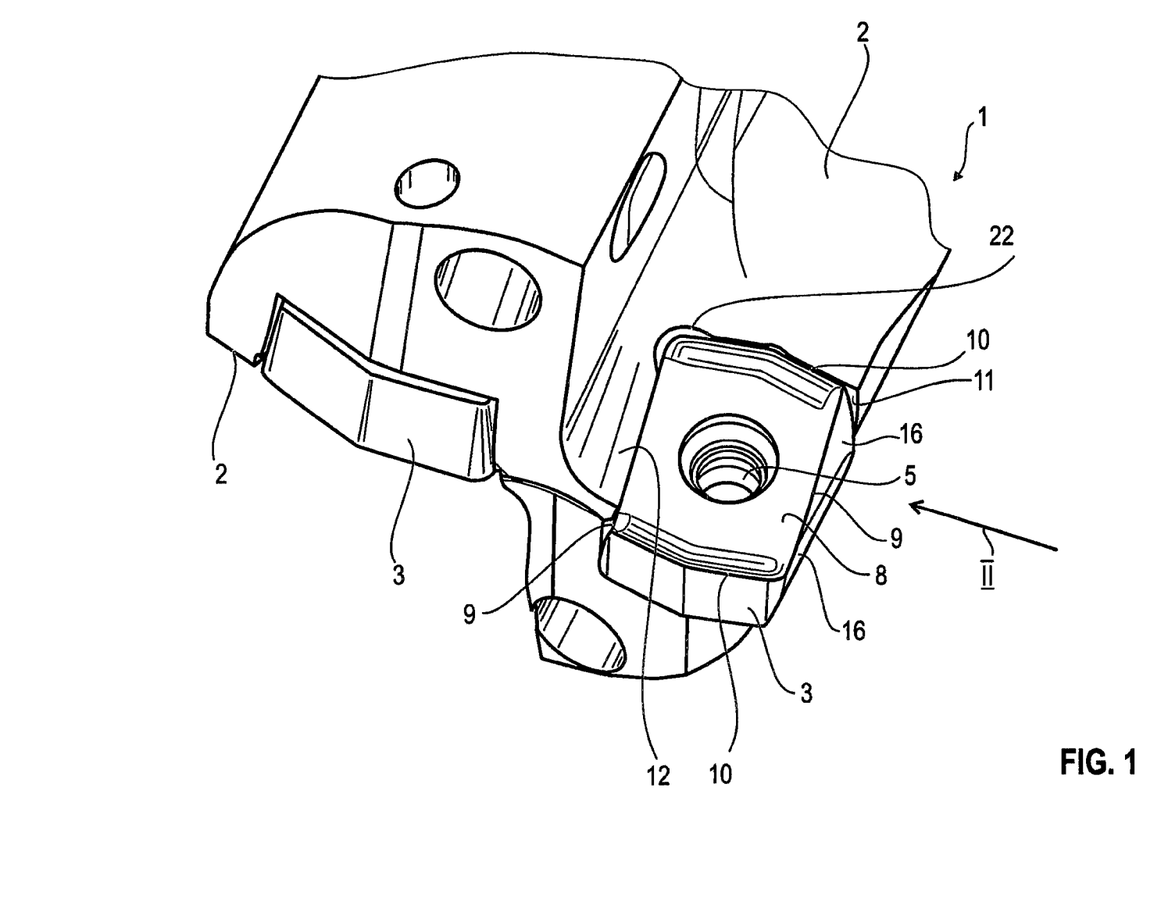
FIG. 1 shows the end of the flute of the drilling tool with indexable insert resting in the insert seat.

In this case, the guide lip 12 overlaps a gap (which cannot be seen in the drawings) between the side wall 11, running around the indexable insert 3, of the insert seat 4 and the inactive cutting edge 9. The guide lip 12 forms a guide surface or a rake face for the cut material. It directs the cut material into the flute 2 for the removal thereof.

Figure 2:
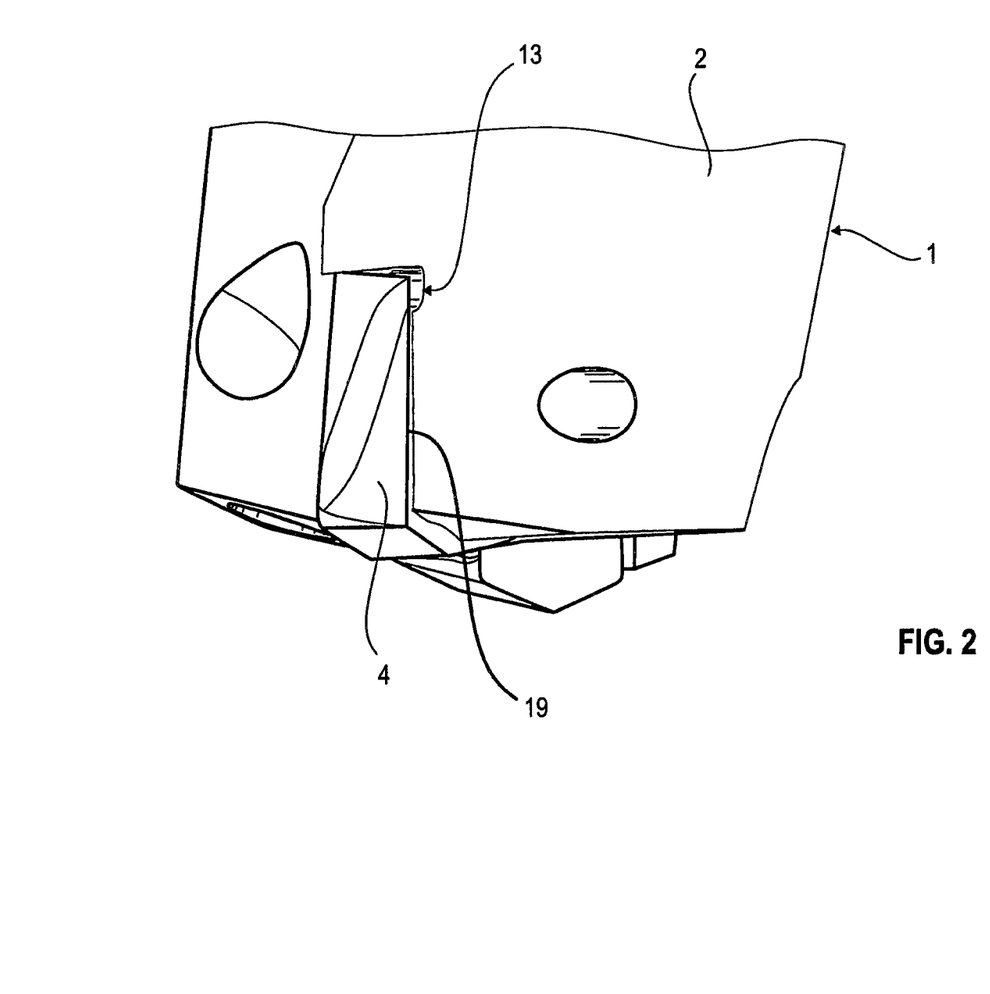
FIG. 2 shows an end view into the insert seat according to arrow II in FIG. 1.

A corner hole 22 formed in the side wall 11 of the insert seat 4 can also be seen in FIG. 1, said corner hole 11 merging into a relieved portion 13, shown in FIG. 2, for accommodating a raised marginal region of the indexable insert 3. The raised marginal region, accommodated by the relieved portion 13, of the indexable insert 3 is arranged on the rake face 8 that cannot be seen in FIG. 1. The relieved portion 13 is therefore concealed in FIG. 1 by the indexable insert 3 and is formed in the holding surface 19 of the insert seat 4. The indexable insert 3 can have rib-shaped chip breakers 14 as in the exemplary embodiment according to FIG. 3. It is equally possible to hollow out the rake face 8 of the indexable insert 3 for forming rising marginal regions 15 which likewise develop a chip-breaking function.

On its long side wall 6, the indexable insert 3 has a region 16 tapering toward each secondary cutting edge 9. This region 16 in each case determines a triangular area on the long side wall 6. Since each long side wall 6 is defined by two secondary cutting edges 9 on their top sides, in each case two triangular areas rotated by 180° relative to one another are determined on each long side wall 6. Both triangular areas have a common triangle line which divides the long side wall 6 in two in an axially symmetrical manner like a diagonal 20. The indexable insert 3 has the greatest extent in the transverse direction 21 along the diagonal 20. The extent in the transverse direction 21 of the indexable insert 3 decreases continuously to its rake faces 8 on account of the tapering of the region 16. The tapering region 16 thus forms a clearance for the indexable insert 3 when the drilling tool 1 is rotating.

Figure 3:
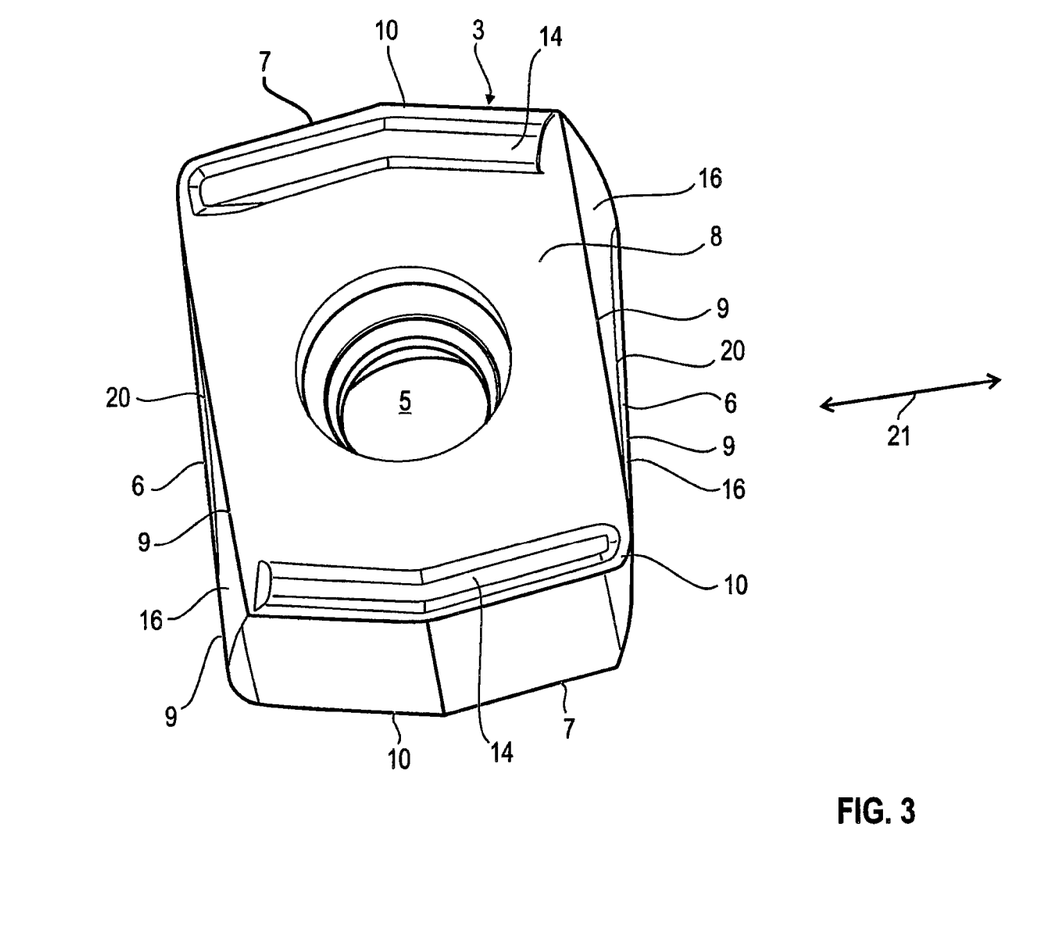
FIG. 3 shows a first embodiment of an indexable insert.
Figure 4:
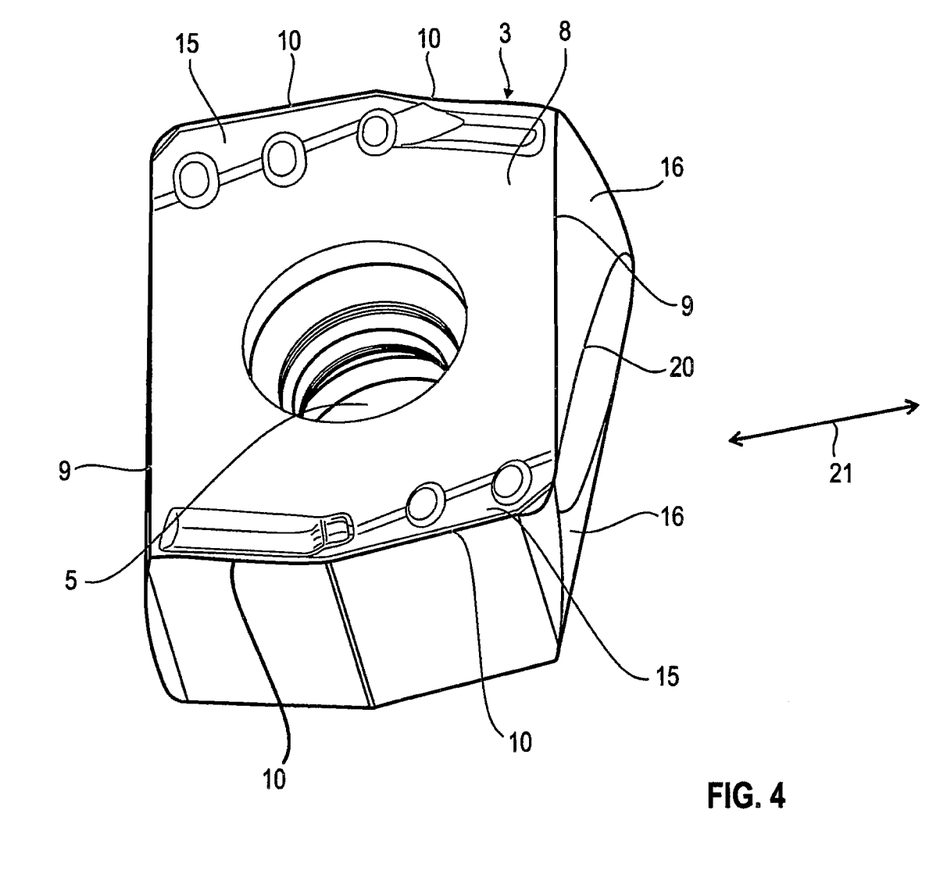
FIG. 4 shows a further embodiment of the indexable insert having a raised marginal edge in the region of a main cutting edge.
Figure 5:
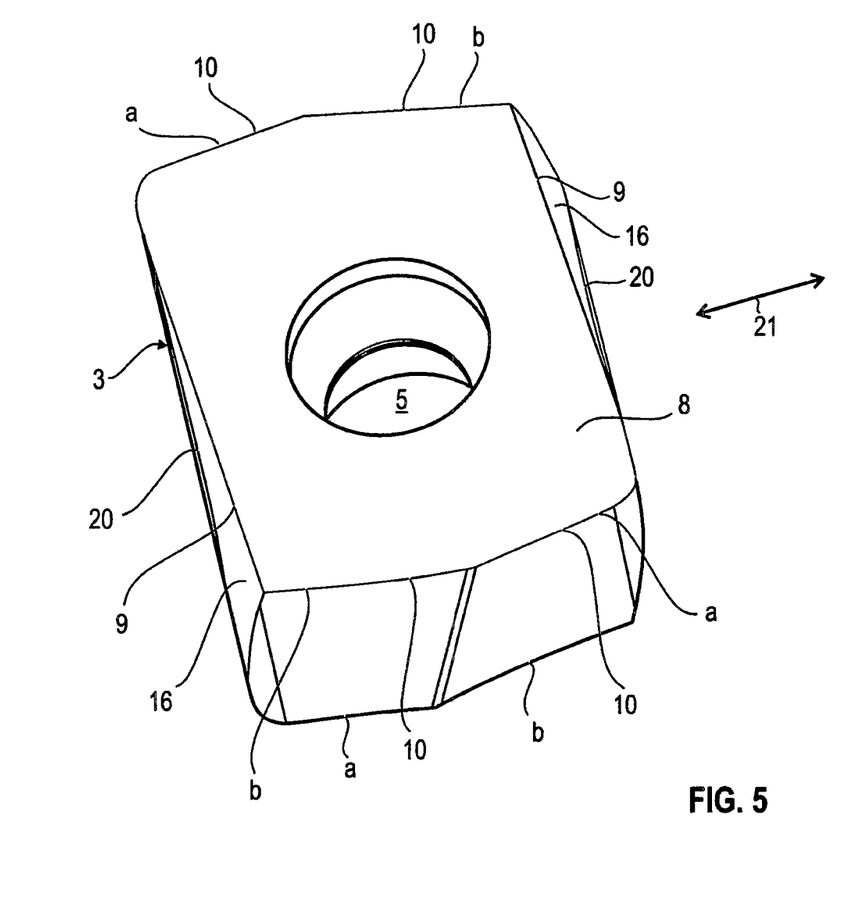
FIG. 5 shows an embodiment of the indexable insert having a two-part main cutting edge with a reduced length of the outer region of the main cutting edge and an increased length of the inner region of the main cutting edge.

In the exemplary embodiment in FIG. 1, FIG. 3 and FIG. 4, the main cutting edge 10 has two sections of the same length that are at an obtuse angle to one another. In contrast thereto, the exemplary embodiment shown in FIG. 5 and FIG. 6 has a main cutting edge having sections of different length that are at an obtuse angle to one another. In this case, the main cutting edge 10 is divided into a shorter outer region identified by a and a longer inner region designated by b.

Figure 6:
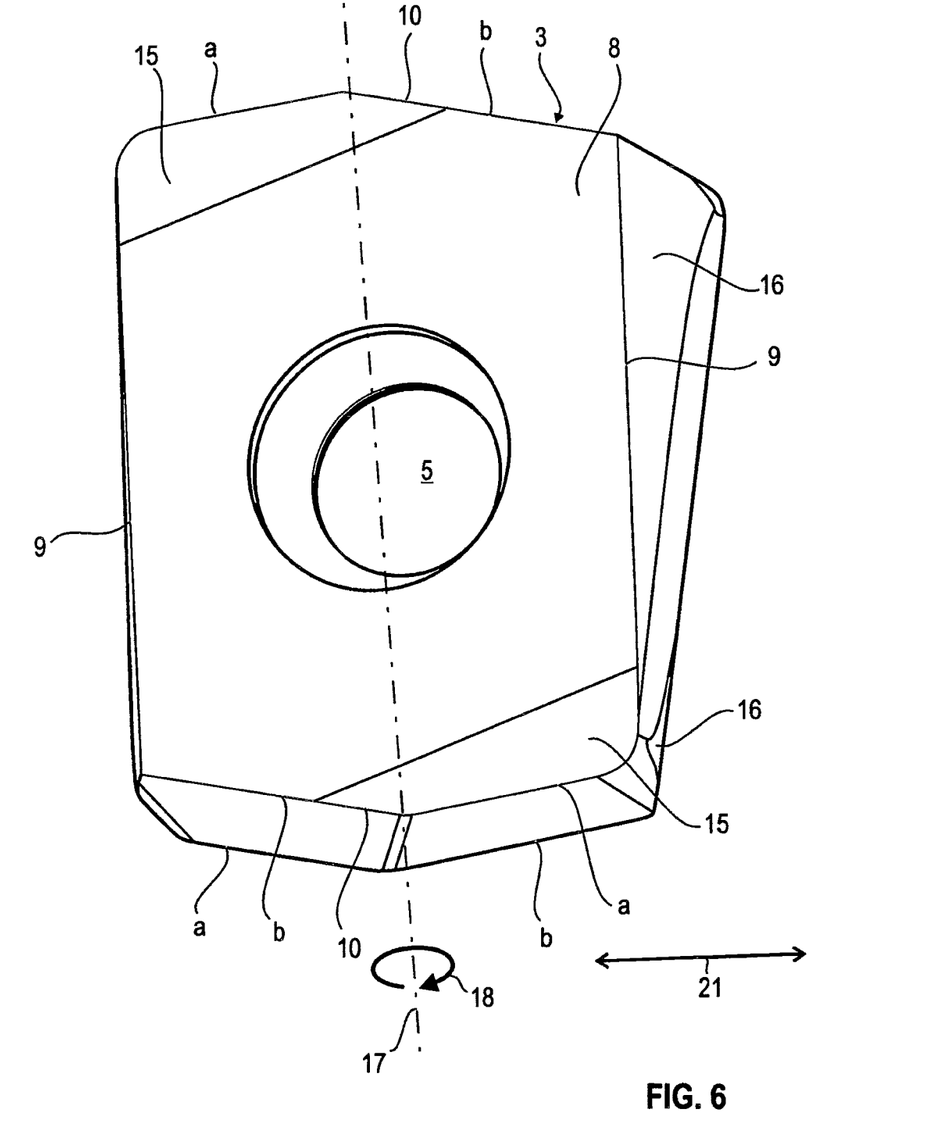
FIG. 6 shows a last embodiment of the indexable insert.

The various indexing possibilities of the indexable insert 3 are explained with reference to FIG. 6. In the case of the indexable insert 3 shown in the various exemplary embodiments, that is to say also in the case of the indexable insert 3 shown in FIG. 6, first of all the rake face 8 facing the viewer and pointing upward is used for machining the workpiece. In the process, work is carried out using the active main cutting edge 10 and the active secondary cutting edge 9 until said edges have become worn. The indexable insert 3 is then released from the drilling tool 1 and rotated by 180° in the insert plane, which corresponds to the drawing plane of the figures of the drawing, in particular also to the drawing plane of FIG. 6. The second cutting edge pair formed by the previous inactive secondary cutting edge 9 and the inactive main cutting edge 10 is thereby deployed as active cutting edge pair. If this second cutting edge pair has also become worn, the indexable insert 3 is again pivoted by 180° in the direction of rotation 18 about its center longitudinal axis 17 shown in FIG. 6. The second rake face 8, which cannot be seen in the drawings and points downward, is thereby deployed. This second rake face 8 directed downward in the drawings also has in turn two cutting edge pairs which are each formed by a secondary cutting edge 9 and a main cutting edge 10.

In the final fitted state, the raised marginal regions 15 rest in relieved portions 13 in the insert seat 4. In this way, the indexable insert 3 rests especially effectively on the holding surface 19 of the insert seat 4. The aim is for the inactive rake face 8 to rest on the holding surface 19 over an especially large area.

The exemplary embodiments are not to be understood in a restrictive manner. Other embodiments of the invention which cannot be seen from the drawings are conceivable.

The invention claimed is:

1. A drilling tool comprising at least one flute for the chip removal and an insert seat formed at the end of the flute as a receptacle for an indexable insert having at least one main cutting edge at each of two narrow sides and having at least one secondary cutting edge at each of two long sides of a rake face side, wherein the indexable insert has two rake face sides facing away from one another and rests with its inactive rake face side on a holding surface of the insert seat, and a section of the inactive secondary cutting edge of its active rake face side rests in the insert seat in such a way as to be disposed a distance from a side wall of the insert seat which is adjacent to it, said distance being created by a slot, and in that a guide lip overlapping the slot projects from the top side of the side wall in the direction of the inactive secondary cutting edge, wherein the guide lip covers the inactive secondary cutting edge of the active rake face.

2. The drilling tool as claimed in claim 1, wherein at least one of the holding surface or the side wall of the insert seat comprises a relieved portion for accommodating a projection of the inactive rake face side of the indexable insert.

3. The drilling tool as claimed in claim 1, wherein a region of at least one long side wall of the body of the indexable insert tapers in the direction of the adjacent secondary cutting edge in order to form a clearance.

4. The drilling tool as claimed in claim 3, wherein the region determines a substantially triangular area on the side wall of the body of the indexable insert.

5. The drilling tool as claimed in claim 1, wherein the guide lip forms a guide surface or a rake face structured to direct cut material into the flute.

\* \* \* \* \*